(12) United States Patent
Yilmaz

(10) Patent No.: US 10,338,759 B1
(45) Date of Patent: Jul. 2, 2019

(54) SENSE ELECTRODE DESIGN

(71) Applicant: Neodrón Limited, Dublin (IE)

(72) Inventor: Esat Yilmaz, Santa Cruz, CA (US)

(73) Assignee: NEODRÓN LIMITED, Dublin (IE)

( * ) Notice: Subject to any disclaimer, the term of this patent is extended or adjusted under 35 U.S.C. 154(b) by 0 days.

(21) Appl. No.: 16/277,636

(22) Filed: Feb. 15, 2019

Related U.S. Application Data

(63) Continuation of application No. 15/915,726, filed on Mar. 8, 2018, now Pat. No. 10,228,808, which is a continuation of application No. 12/605,779, filed on Oct. 26, 2009, now Pat. No. 9,916,045.

(51) Int. Cl.
*G06F 3/044* (2006.01)

(52) U.S. Cl.
CPC ........ *G06F 3/044* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 5,083,118 A | 1/1992 | Kazama | |
| 6,297,811 B1 | 10/2001 | Kent et al. | |
| 6,522,047 B1* | 2/2003 | Toda | H03H 9/1455 310/313 B |
| 7,129,935 B2* | 10/2006 | Mackey | G06F 3/044 345/174 |
| 7,151,528 B2* | 12/2006 | Taylor | G06F 3/0414 345/168 |
| 7,382,139 B2* | 6/2008 | Mackey | G06F 3/044 324/660 |
| 7,548,073 B2* | 6/2009 | Mackey | G01D 5/2415 324/660 |
| 7,589,713 B2 | 9/2009 | Sato | |
| 7,663,607 B2 | 2/2010 | Hotelling et al. | |
| 7,808,255 B2 | 10/2010 | Hristov et al. | |
| 7,864,160 B2* | 1/2011 | Geaghan | G06F 3/044 345/173 |
| 7,864,503 B2 | 1/2011 | Chang | |
| 7,875,814 B2 | 1/2011 | Chen et al. | |
| 7,920,129 B2 | 4/2011 | Hotelling et al. | |
| 8,004,499 B2* | 8/2011 | Geaghan | G06F 3/044 345/173 |
| 8,031,094 B2 | 10/2011 | Hotelling et al. | |
| 8,031,174 B2 | 10/2011 | Hamblin et al. | |

(Continued)

FOREIGN PATENT DOCUMENTS

WO 2012129247 A2 9/2012

OTHER PUBLICATIONS

Trend et al., U.S. Appl. No. 13/327,381, Applicant-Initiated Interview Summary, dated Apr. 16, 2014.

(Continued)

*Primary Examiner* — Chanh D Nguyen
*Assistant Examiner* — Karin Kiyabu
(74) *Attorney, Agent, or Firm* — Shami Messinger PLLC

(57) ABSTRACT

A touch sensitive device includes a plurality of sense electrodes arranged in a pattern to receive charge from drive electrodes. The pattern of sense electrodes has extreme portions having worst case charge transfer times, wherein the worst case charge transfer time at multiple extreme portions is substantially equal.

20 Claims, 5 Drawing Sheets

(56) References Cited

U.S. PATENT DOCUMENTS

| | | | |
|---|---|---|---|
| 8,040,326 B2 | 10/2011 | Hotelling et al. | |
| 8,049,732 B2 | 11/2011 | Hotelling et al. | |
| 8,179,381 B2 | 5/2012 | Frey et al. | |
| 8,217,902 B2 | 7/2012 | Chang et al. | |
| 8,502,796 B1* | 8/2013 | Yilmaz | G06F 3/044 178/18.06 |
| 8,593,425 B2 | 11/2013 | Hong et al. | |
| 8,599,150 B2 | 12/2013 | Philipp | |
| 8,638,112 B2* | 1/2014 | Day | G06F 3/044 178/18.03 |
| 8,665,236 B2 | 3/2014 | Myers | |
| 8,692,799 B1 | 4/2014 | Landry et al. | |
| 8,786,572 B2* | 7/2014 | Yilmaz | G06F 3/044 345/174 |
| 8,797,290 B2 | 8/2014 | Yilmaz | |
| 8,823,653 B2 | 9/2014 | Matsuo | |
| 8,830,180 B2 | 9/2014 | Yilmaz et al. | |
| 8,860,690 B2 | 10/2014 | Trend et al. | |
| 8,901,944 B2* | 12/2014 | Chai | G06F 3/044 324/658 |
| 8,970,523 B2 | 3/2015 | Lin et al. | |
| 9,116,582 B2 | 8/2015 | Mohindra et al. | |
| 9,372,579 B2 | 6/2016 | Philipp | |
| 9,425,790 B2* | 8/2016 | Stone | H03K 17/955 |
| 9,436,324 B2 | 9/2016 | Singh et al. | |
| 9,436,328 B2 | 9/2016 | Trend et al. | |
| 9,626,045 B1 | 4/2017 | Yilmaz | |
| 9,632,628 B2 | 4/2017 | Philipp et al. | |
| 9,760,207 B2 | 9/2017 | Trend | |
| 9,817,533 B2 | 11/2017 | Bulea et al. | |
| 9,829,523 B1* | 11/2017 | Peterson | G06F 3/044 |
| 9,869,706 B2 | 1/2018 | Lock et al. | |
| 9,904,429 B2 | 2/2018 | Lee et al. | |
| 9,916,045 B2 | 3/2018 | Yilmaz | |
| 10,228,808 B2 | 3/2019 | Yilmaz | |
| 2002/0075132 A1* | 6/2002 | Toda | G06K 7/0008 340/5.61 |
| 2002/0101408 A1* | 8/2002 | Sano | G06F 3/0436 345/173 |
| 2002/0171635 A1* | 11/2002 | Takahashi | G06F 3/0436 345/177 |
| 2003/0076308 A1 | 4/2003 | Sano et al. | |
| 2005/0270039 A1* | 12/2005 | Mackey | G06F 3/044 324/660 |
| 2006/0038791 A1* | 2/2006 | Mackey | G06F 3/044 345/173 |
| 2006/0097991 A1 | 5/2006 | Hotelling et al. | |
| 2006/0250376 A1* | 11/2006 | Takahashi | G06F 3/044 345/173 |
| 2007/0074914 A1* | 4/2007 | Geaghan | G06F 3/044 178/18.06 |
| 2007/0176608 A1* | 8/2007 | Mackey | G01D 5/2415 324/660 |
| 2007/0247443 A1 | 10/2007 | Philipp et al. | |
| 2007/0257894 A1* | 11/2007 | Philipp | G06F 3/044 345/173 |
| 2007/0279395 A1* | 12/2007 | Philipp | G01R 27/2605 345/173 |
| 2008/0074398 A1 | 3/2008 | Wright | |
| 2008/0158178 A1 | 7/2008 | Hotelling et al. | |
| 2008/0246496 A1 | 10/2008 | Hristov et al. | |
| 2008/0309635 A1 | 12/2008 | Matsuo | |
| 2009/0159344 A1* | 6/2009 | Hotelling | G06F 3/044 178/18.06 |
| 2009/0166100 A1 | 7/2009 | Matsubara | |
| 2009/0194344 A1* | 8/2009 | Harley | G06F 3/044 178/18.06 |
| 2009/0267914 A1* | 10/2009 | Dews | G06F 3/044 345/173 |
| 2009/0277696 A1* | 11/2009 | Reynolds | G06F 3/03547 178/18.06 |
| 2009/0315854 A1 | 12/2009 | Matsuo | |
| 2010/0007628 A1 | 1/2010 | Eriguchi et al. | |
| 2010/0026655 A1* | 2/2010 | Harley | G06F 3/044 345/174 |
| 2010/0044122 A1 | 2/2010 | Sleeman et al. | |
| 2010/0045614 A1* | 2/2010 | Gray | G06F 3/044 345/173 |
| 2010/0045615 A1 | 2/2010 | Gray et al. | |
| 2010/0045632 A1 | 2/2010 | Yilmaz et al. | |
| 2010/0085326 A1 | 4/2010 | Anno | |
| 2010/0252335 A1 | 10/2010 | Orsley et al. | |
| 2010/0271330 A1 | 10/2010 | Philipp | |
| 2010/0309162 A1* | 12/2010 | Nakanishi | G06F 3/044 345/174 |
| 2010/0328255 A1* | 12/2010 | Ishizaki | G06F 3/044 345/174 |
| 2011/0018557 A1 | 1/2011 | Badaye et al. | |
| 2011/0062971 A1* | 3/2011 | Badaye | G06F 3/044 324/686 |
| 2011/0095990 A1 | 4/2011 | Philipp et al. | |
| 2011/0095997 A1 | 4/2011 | Philipp | |
| 2011/0096015 A1 | 4/2011 | Yilmaz | |
| 2011/0096016 A1 | 4/2011 | Yilmaz et al. | |
| 2012/0044171 A1* | 2/2012 | Lee | G06F 3/0412 345/173 |
| 2012/0046887 A1* | 2/2012 | XiaoPing | G06F 3/03547 702/57 |
| 2012/0113014 A1* | 5/2012 | Yilmaz | G06F 3/044 345/173 |
| 2012/0227259 A1* | 9/2012 | Badaye | G06F 3/044 29/846 |
| 2012/0242588 A1 | 9/2012 | Myers et al. | |
| 2012/0242592 A1 | 9/2012 | Rothkopf et al. | |
| 2012/0243151 A1 | 9/2012 | Lynch | |
| 2012/0243719 A1 | 9/2012 | Franklin et al. | |
| 2012/0256877 A1 | 10/2012 | Lin et al. | |
| 2013/0076612 A1 | 3/2013 | Myers | |
| 2013/0154995 A1 | 6/2013 | Trend et al. | |
| 2013/0181943 A1* | 7/2013 | Bulea | G06F 3/044 345/174 |
| 2013/0207924 A1* | 8/2013 | Mohindra | G06F 3/044 345/174 |
| 2013/0265244 A1 | 10/2013 | Kim et al. | |
| 2015/0028894 A1 | 1/2015 | Sleeman et al. | |
| 2016/0334910 A1* | 11/2016 | Ono | G06F 3/0412 |
| 2017/0010714 A1* | 1/2017 | Lee | G06F 3/0416 |
| 2017/0010715 A1* | 1/2017 | Lee | G06F 3/044 |
| 2017/0097703 A1* | 4/2017 | Lee | G06F 3/044 |
| 2017/0097727 A1* | 4/2017 | Wu | G06F 3/0412 |
| 2018/0113532 A1* | 4/2018 | Shinoda | G06F 3/044 345/174 |
| 2018/0113533 A1* | 4/2018 | Shinoda | G06F 3/044 345/174 |
| 2019/0087051 A1* | 3/2019 | Yao | H01L 27/3265 |

OTHER PUBLICATIONS

Trend et al., U.S. Appl. No. 13/327,381, Non-Final Office Action, dated Jan. 16, 2014.
Trend et al., U.S. Appl. No. 13/327,381, Notice of Allowance, dated Jun. 11, 2014.
Trend et al., U.S. Appl. No. 13/327,381, Response to Non-Final Office Action, dated Apr. 14, 2014.
U.S. Appl. No. 61/454,894, filed Mar. 21, 2011, Rothkopf.
U.S. Appl. No. 61/454,936, filed Mar. 21, 2011, Myers.
U.S. Appl. No. 61/454,950, filed Mar. 21, 2011, Lynch.
Decision, Entered in Ex Parte Esat Yilmaz, Appeal 2015-001941 (P.T.A.B.), Entered Sep. 1, 2016.

* cited by examiner

US 10,338,759 B1

SENSE ELECTRODE DESIGN

RELATED APPLICATION

This non-provisional application is a continuation under 35 U.S.C. § 120 of U.S. application Ser. No. 15/915,726 filed Mar. 8, 2018, which is a continuation of U.S. application Ser. No. 12/605,779 filed Oct. 26, 2009 entitled "Sense Electrode Design," each of which is incorporated herein by reference.

BACKGROUND

Touchscreen displays are able to detect a touch such as by a finger or stylus within an active or display area. Use of a touchscreen as part of a display enables a user to interact with an electronic application by touching the touchscreen. The display may present images to the user. Such images may include user interface constructs such as different buttons, images, or other regions that can be selected, manipulated, or actuated by touch. Touchscreens can therefore provide an effective user interface for cell phones, GPS devices, personal digital assistants (PDAs), computers, ATM machines, appliances and other devices.

Touchscreens use various technologies to sense touch from a finger or stylus, such as resistive, capacitive, infrared, and acoustic sensors. Capacitive touchscreens often use one or more layers of transverse electrodes, drive electrodes and sense electrodes. In one type of capacitive sensor based touchscreen, a touch changes a capacitance at a node in an array of electrodes overlaying the display device. A node is typically thought of as the area where a drive electrode and a receive electrode overlap or otherwise run adjacent.

Transparent electrodes such as indium tin oxide (ITO) or transparent conductive polymers may be used to form the electrodes. Some layouts of electrodes utilize a flooded type pattern of drive electrodes to shield the sense electrodes from electric field interference from an underlying display such as a liquid crystal display (LCD). The flooded type pattern may use solid fill drive electrode patterns formed in a layer between the sense electrodes and display.

In some prior touchscreen devices, the layer of electrodes closest to the display, are the drive electrodes, and run in a first direction. The sense electrodes include spines that run transverse to the drive electrodes, and may also include crossbars that run in the same direction as the drive electrodes. In such prior devices, the resistance to connection lines from portions of the crossbar electrode farthest from connection lines on the touchscreen is greater than the resistance to connection lines from portions of the crossbars closer to the connection lines. The electronics may contain sense circuitry having a sense capacitor. The sense circuitry operate to accommodate a worst case charge transfer time, having resistive and capacitive components, to allow sufficient charge to transfer from the drive electrodes through the sense electrodes to the sense capacitor. Long charge transfer times could significantly slow down the operation of the touchscreen.

DETAILED DESCRIPTION

Figure 1A:
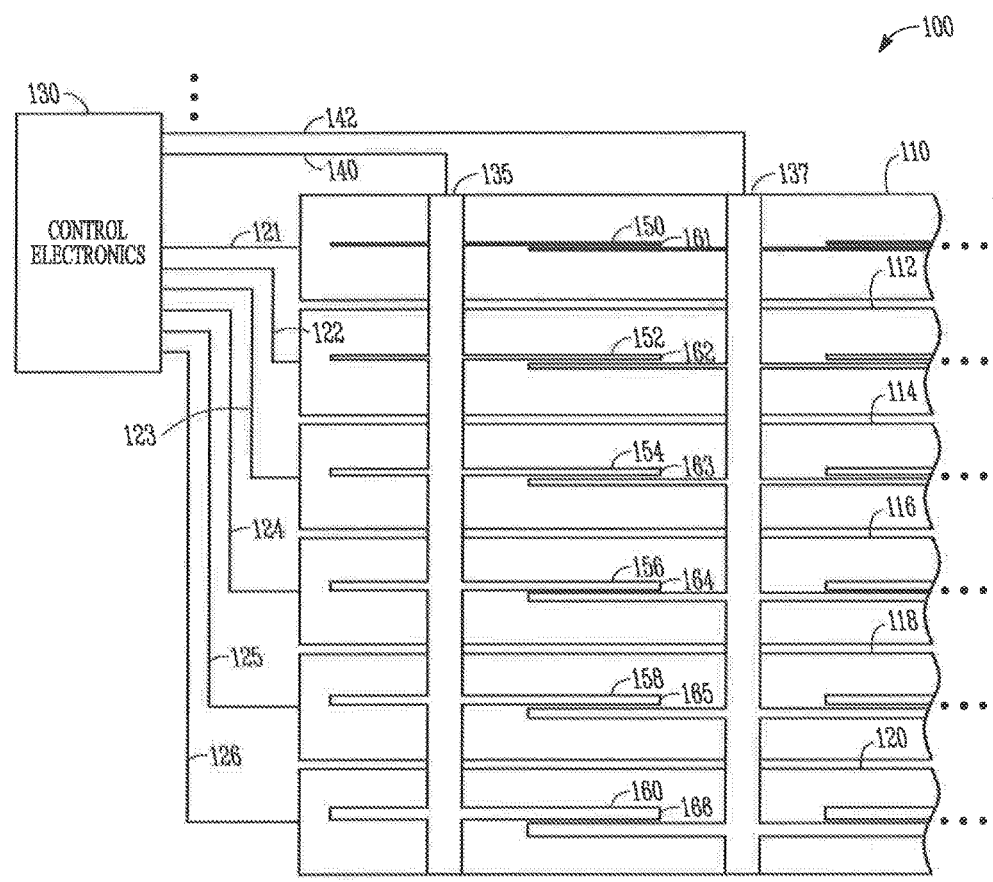
FIG. 1A is a schematic representation of an electrode layout for a touch sensitive device according to an example embodiment.
Figure 1B:
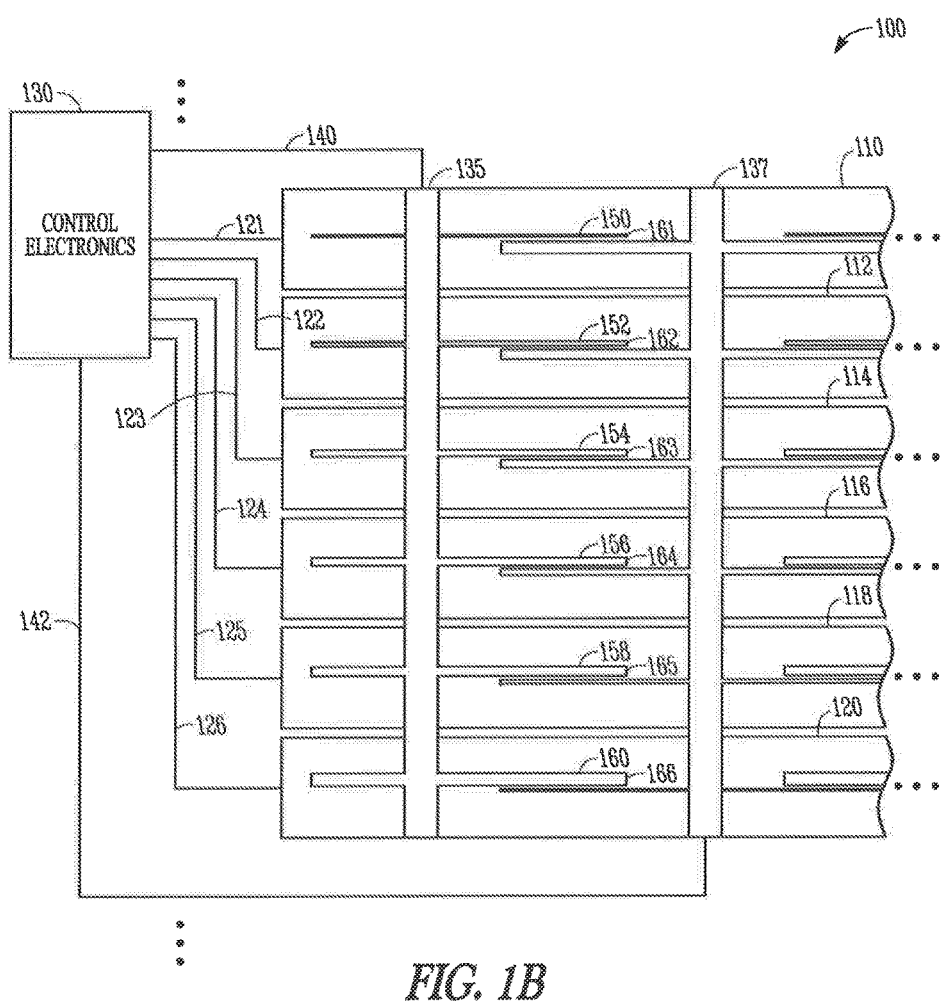
FIG. 1B is a schematic representation of an alternative electrode layout for a touch sensitive device according to an example embodiment.

FIGS. 1A and 1B are schematic representations of an electrode layout for an example touch sensitive device 100 such as a touchscreen. In one embodiment, a plurality of longitudinal drive electrodes 110, 112, 114, 116, 118, and 120 are formed in one layer. The drive electrodes may also be referred to as X electrodes. In the example shown, the drive electrodes are bar shaped, and completely filled in to help create a shield from electric field interference from an underlying display device, such as a liquid crystal display (LCD). This type of drive electrode layout may be referred to as a flooded X pattern. The distance between the drive electrodes may be minimized in one embodiment to provide better shielding. The dimensions shown in the drawings may not be to scale and are not meant to be an accurate representation of the dimensions that may be used in various embodiments, but rather may be exaggerated to more clearly illustrate the concepts described herein.

In further embodiments, the drive electrodes 110, 112, 114, 116, 118, and 120 may be other than rectangular in shape, and may have more of a zig-zag pattern to minimize their visibility.

The drive electrodes 110, 112, 114, 116, 118, and 120 may be coupled via drive lines 121, 122, 123, 124, 125, and 126 to electronics 130 to drive the drive electrodes during operation of the touch sensitive device 100. In addition to the drive electrodes, one or more sense electrodes 135, 137 may run transverse to the drive electrodes. In one embodiment, the sense electrodes 135, 137 may be formed of a conductive transparent material such as indium tin oxide (ITO) or transparent conductive polymers. Such materials, which while conductive, have a resistance. The resistance of electrodes made of such materials may change depending on the width of the electrode.

The sense electrodes 135, 137 may be coupled to electronics 130 via connection lines 140 and 142 respectively. In one embodiment, the connection lines 140 and 142 may be highly conductive and formed of metal. The sense electrodes are single connected in one embodiment, in that only one end of the sense electrodes is coupled to the electronics 130. In one embodiment, sense electrodes 135 and 137 include a spine that runs transverse to the drive electrodes, and may also include crossbars transverse to the spine of sense electrode 135 and having different widths as indicated at 150, 152, 154, 156, 158, and 160. The crossbars run in the same direction as corresponding drive electrodes and are positioned over the respective drive electrodes 110, 112, 114, 116, 118, and 120.

In one embodiment, the crossbars extend from both sides of the spines, and have tips indicated on one end of the crossbars at 161, 162, 163, 164, 165, and 166 that are the furthest distance from the spine 135. The other ends of the crossbars may be the same distance from the spine 135 in various embodiments. The width of the crossbars in one embodiment increases with distance from the end of the spines coupled to the connection lines 140, 142. The increase in width decreases the resistance of the crossbars while increasing their capacitance to the drive electrodes. In one embodiment, the increase in width keeps the charge transfer time of each crossbar at or under a desired threshold. The charge transfer time is the time it takes to transfer sufficient charge from the drive electrodes through the sense electrodes to the sense capacitor. In a further embodiment, the charge transfer time of each crossbar is substantially equal, taking into account process tolerances.

Thus, it can be observed that the width of crossbar 150 is fairly narrow. The width increases with successive crossbars 152-160 such that the widest crossbar 160 is furthest from the connection line 140. In one example embodiment, the width of the spine of sense electrode 135 may be approximately 1 mm, and the width of the crossbars may progress from 0.2 mm to 0.5 mm or wider, including wider than the spine in some embodiments. Note that spine 137 has corresponding crossbars, as would additional spines as represented by the dots. The crossbars from adjacent spines may run adjacent to each other in further embodiments. In one embodiment, the crossbars extend about 75 percent of the distance between the spines, and thus run adjacent together for about 50 percent of their length as shown. The amount of adjacent run may vary in further embodiments. The spines may be narrower or wider than 1 mm in various embodiments consistent with desired charge transfer time and visibility constraints.

In one embodiment, the widths of the crossbars may be determined by starting with the worst case charge transfer time. In FIGS. 1A and 1B, the worst case charge transfer time would be the longest path from tip 166 of crossbar 160, along the spine of sense electrode 135 to connection line 140. After determining the width of crossbar 160 in accordance with a desired charge transfer time, the remaining crossbar widths are chosen to obtain charge transfer times equal to or less than the desired charge transfer time. The charge transfer time is generally a function of a resistance and a capacitance, where the resistance is the resistance from crossbar tip to the connection line of the sense electrode, and the capacitance is the capacitance between the drive electrodes and the sense electrode. The capacitance is affected by touch proximate the intersection of a sense electrode and a drive electrode. The worst case charge transfer time, T, may be calculated and used as a threshold or design parameter for ensuring that the charge transfer time at the tips of each crossbar is less than the worst case T, or equal to it. This results in the illustrated pattern of crossbar widths increasing with increased distance from the connection line.

Since some crossbars may be narrower, the capacitance may be reduced over the length of the sense electrodes. Sense electrodes may be increased in width to reduce the worst case charge transfer time. The use of wider crossbars for selected crossbars allows a reduction in the worst case charge transfer time. Narrower crossbars for selected crossbars reduces the capacitive coupling between the sense electrodes and the drive electrodes and hence allows a reduction in overall thickness of sensing portions of touch sensitive devices. This reduction in sense electrode layer thickness may result in a reduced overall touch sensitive device thickness, and may further reduce drive electrode to sense electrode separation.

In some embodiments, the worst case charge transfer time may be reduced by making some of the crossbars wider, while others already having a shorter charge transfer time may be made narrower.

In one embodiment, a sense electrode design may be optimized by making a worst case charge transfer time equal at all extremes of the electrode design. Such designs may or may not include crossbars, and the extremes of the design may or may not have electrode structures with equal widths. The charge transfer times of such sense electrodes should be substantially equal such that the charge transfer time does not adversely impact operation of a touch sensitive device. In one embodiment, the extremes of the design may correspond to portions of the electrode design that are furthest from a connection line that has a relatively higher conductivity than that of the electrode. In further embodiments, the extremes of the electrode design may additionally correspond to portions of the electrode design that have smaller widths than other portions of the design, and may not directly correspond to portions of the design that are furthest from higher conductivity connection lines. In some embodiments, there may be a mixture of such extremes, including remote portions and narrow portions of the electrodes. In one embodiment, the width of such portions may be modified to ensure that the sense electrodes have a charge transfer time that is equal to or better than a desired worst case charge transfer time.

The layout of FIG. 1B shows sense electrodes with varying crossbar widths as described above. In FIG. 1B, adjacent sense electrodes are arranged to be coupled to connection lines on alternate opposite ends. This results in the width of electrodes progressing along the spines from alternate opposite ends. The adjacent crossbars from adjacent spines are arranged such that the widest crossbars runs adjacent to the narrowest crossbars, while crossbars of medium width run adjacent to each other. Thus the combined width of the adjacent crossbars may be fairly equal in some embodiments over the length of the spines.

Figure 2:
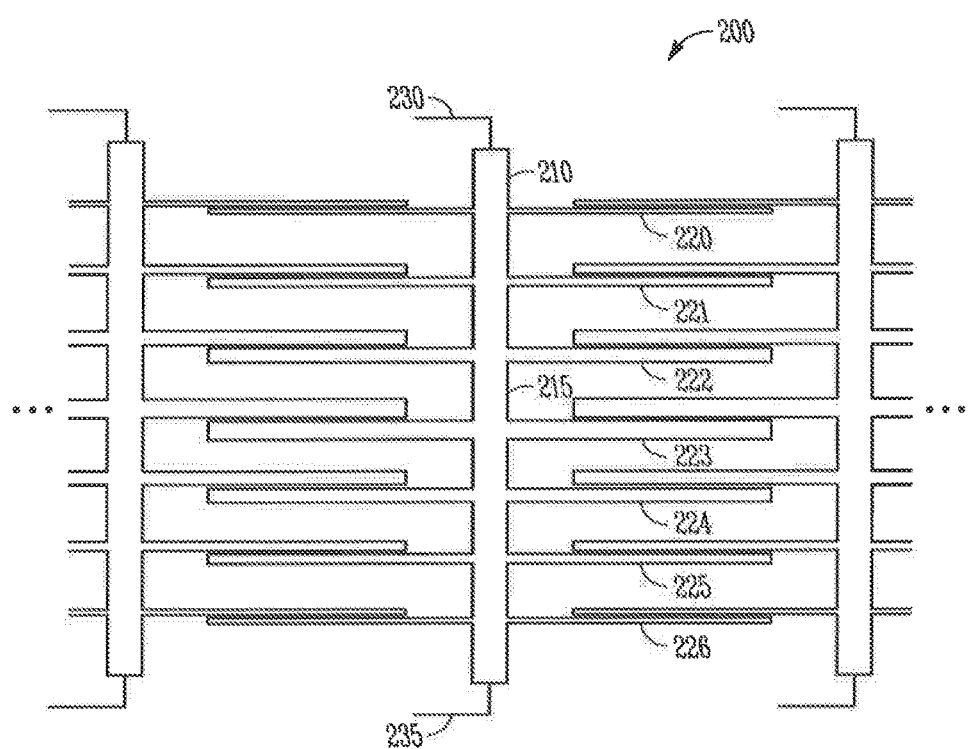
FIG. 2 is a schematic representation of an alternative sense electrode layout according to an example embodiment.

FIG. 2 is a schematic representation of an alternative sense electrode layout 200 according to an example embodiment. Layout 200 shows one sense electrode 210 having a spine 215 with multiple transverse crossbars 220, 221, 222, 223, 224, 225, and 226. Sense electrode 210 in one embodiment is double connected, meaning that both ends of the sense electrode 210 are coupled to connection lines as indicated by connection lines 230 and 235. For each electrode, the corresponding connection lines 230 and 235 are coupled together for coupling to a controller to individually sense signals from the electrodes. Since sense electrode 210 is connected on both ends, the crossbar being furthest from a connection line is actually the middle crossbar 223. Crossbar 223 would be the crossbar exhibiting the worst case charge transfer time, but as shown, it has been widened to obtain a desired charge transfer time. The crossbars continue to decrease in width in both directions from crossbar 223 toward respective connection lines 230 and 235.

In one embodiment, with an odd number of crossbars, crossbars 222 and 224 may be equal in width, crossbars 221 and 225 may be equal in width, and crossbars 220 and 226 may also be equal in width. With an even number of crossbars, there may be two middle crossbars with equal width, rather than one. Both may be the same distance from a connection line, and thus, the worst case charge transfer time from their tips to the connection lines may be the same. The rest of the crossbars may be successively narrower, as there is no need to make them as wide as the widest crossbar. In fact, in one embodiment, it is desired that the charge transfer time from the tip of each crossbar to the nearest connection line be equal, meaning that the width is decreased as the distance to the nearest connection line decreases. Additional sense electrodes that have the varying width crossbar arrangement may be provided as indicated by the additional sense electrode with crossbars running adjacent crossbars 220, 221, 222, 223, 224, 225, and 226, and dots indicating a repeating pattern of sense electrodes. It is understood that the dimensions of FIG. 2, as well as the other drawings, may not be to scale and are not meant to be an accurate representation of the dimensions that may be used in various embodiments, but rather, the dimensions may be exaggerated to more clearly illustrate the concepts described herein.

Figure 3:
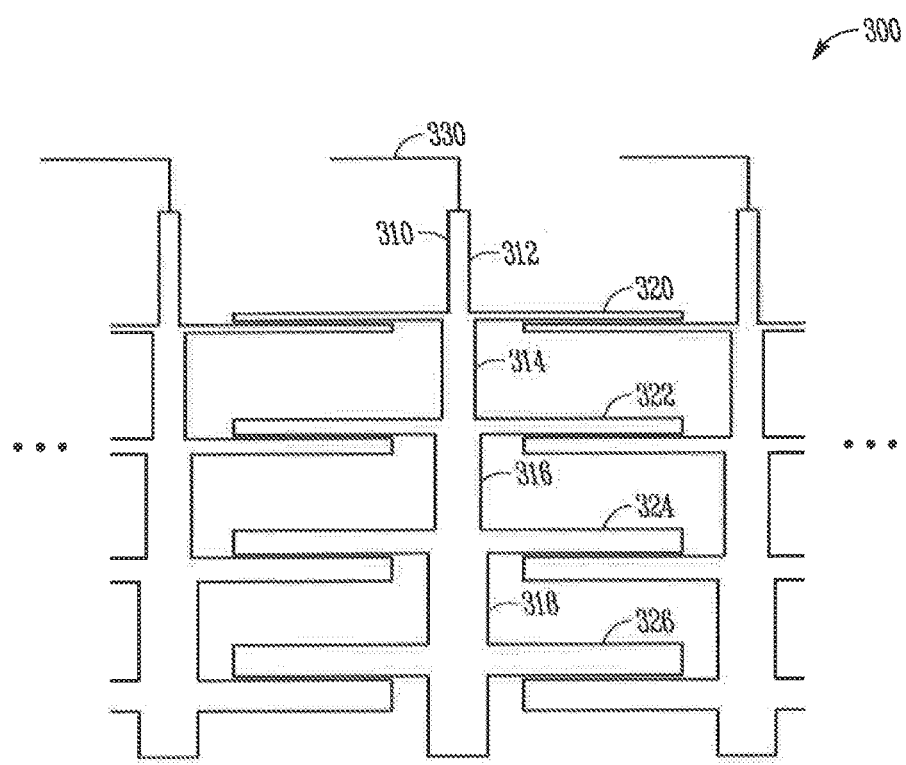
FIG. 3 is a schematic representation of a further alternative sense electrode layout according to an example embodiment.

FIG. 3 is a schematic representation of a further alternative sense electrode layout 300 according to an example embodiment. Layout 300 includes a sense electrode 310 having different widths 312, 314, 316, and 318 along its spine. Several transverse crossbars 320, 322, 324, and 326 are shown coupled to the sense electrode 310. As shown, the width of the spine increases with increasing distance from a single connected connection line 330. With each increase of spine width in one embodiment, a crossbar is coupled to the sense electrode. The crossbars may be connected at other points on the sense electrode where the sense electrode does not transition in width. In further embodiments, the width of the sense electrode may continuously vary, or may vary in a stepwise manner, with multiple crossbars coupled to each section of constant width. Various embodiments may include adjacent sense electrodes arranged to be coupled to connection lines on alternate opposite ends as illustrated in FIG. 1B.

The crossbars 320, 322, 324 and 326 are also shown as varying in their width. As previously described, the worst case charge transfer time from a tip of the crossbar farthest from the connection line 330 may be used. In this case, that would be crossbar 326. The charge transfer time again is the total charge transfer time from the tip of the crossbar 326 to the connection line 330. In this case, the charge transfer time may be reduced by the fact that the spine is increasing in width. Thus, the width of crossbar 326 may not be as wide as in previous embodiments to meet a desired worst case charge transfer time. The same reduction in width for succeeding crossbars closer to connection line 330 may also be obtained. As with previous electrode patterns, additional spines with crossbars may be provided in various patterns to obtain a pattern having a desired area.

Figure 4:
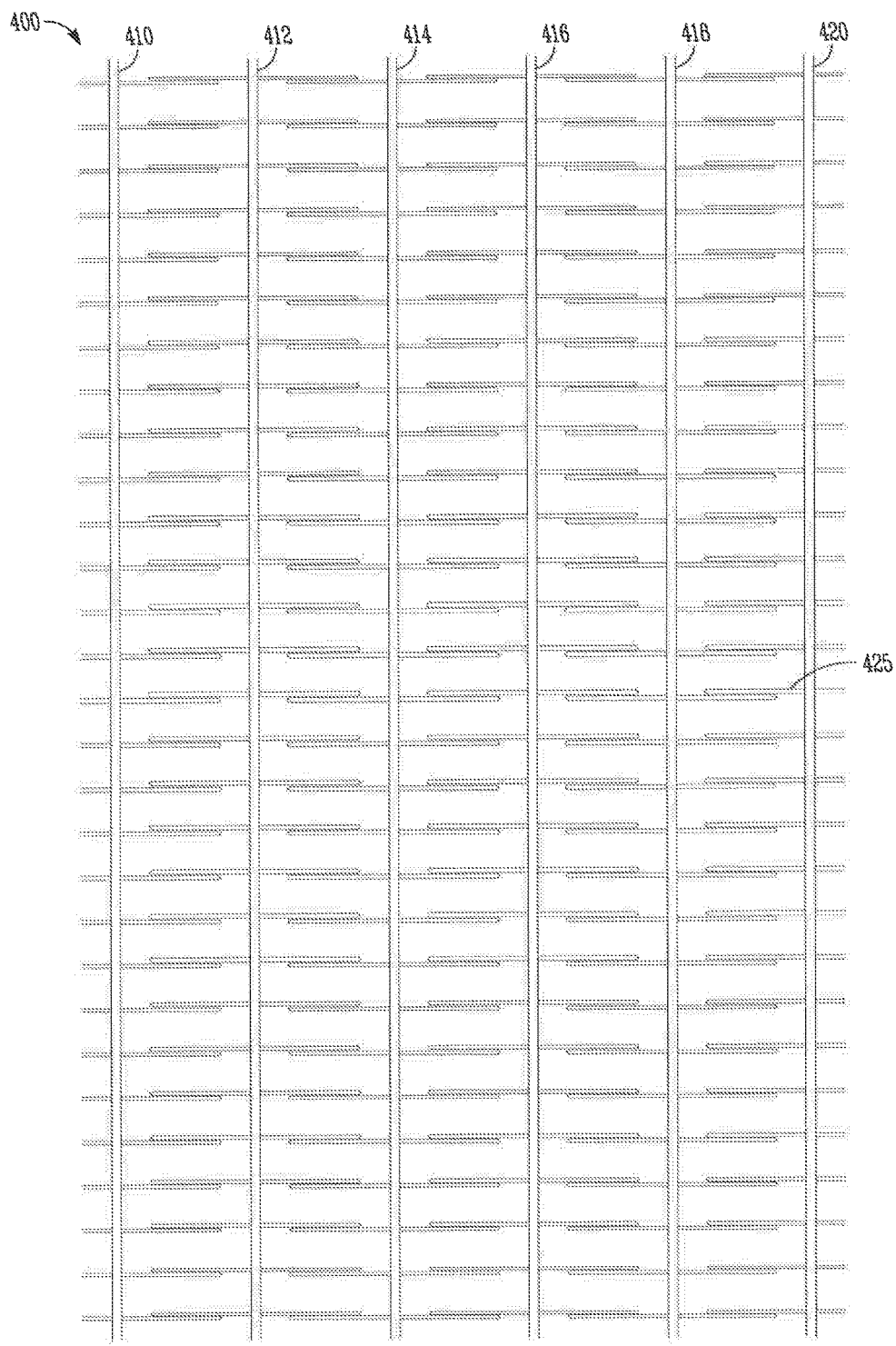
FIG. 4 is a schematic representation of a further alternative sense electrode layout for a touch sensitive device according to an example embodiment.

FIG. 4 is a schematic representation of a further alternative sense electrode layout 400 for a touch screen. Six spines 410, 412, 414, 416, 418 and 420 are shown and representative of sense electrodes for an entire touchscreen in one embodiment. Each of the spines may be double connected such that both ends may be coupled to sense circuitry. Similar to FIG. 2, each spine has multiple transverse crossbars. Twenty nine crossbars per spine are illustrated. Since the spines are connected on both ends, the crossbar being furthest from a low resistance connection (not shown) to the sense circuitry is actually the middle crossbar 425, which is the 15th crossbar from either end of the spines. Crossbar 425 is thus the crossbar exhibiting the worst case charge transfer time until it is widened as shown to obtain a desired charge transfer time. The crossbars continue to decrease in width in both directions from crossbar 425 toward respective connections to sense circuitry.

The invention claimed is:

1. An apparatus, comprising:
    a touchscreen display comprising:
        a layer containing a plurality of substantially transparent longitudinal drive electrodes separated from each other by a gap;
        a layer containing a plurality of substantially transparent sense electrodes formed in the shape of spines running transverse to the drive electrodes; wherein each sense electrode spine comprises an end to couple to drive lines and a plurality of crossbars that generally run in the same direction as the drive electrodes;
        a first plurality of conductive drive lines electrically connected to the plurality of drive electrodes;
        a second plurality of conductive drive lines electrically connected to the plurality of sense electrodes;
        a dielectric layer separating the layer of drive electrodes from the layer of sense electrodes; and
        an underlying display configured to produce an image;
        wherein the plurality of sense electrodes comprises at least two sense electrode spines wherein a first sense electrode spine is connected to drive lines at a first end of the first sense electrode spine, and a second sense electrode spine is connected to drive lines at a second end of the second sense electrode spine; wherein the first end and second end are on opposite sides;
        wherein the first sense electrode spine and the second sense electrode spine are adjacent to each other;
        wherein the plurality of crossbars generally increase in width;
        wherein the crossbar of the first sense electrode spine that has the largest width runs adjacent to the crossbar of the second sense electrode spine that has the smallest width, and the crossbar of the first sense electrode spine that has the smallest width runs adjacent to the crossbar of the second sense electrode spine that has the largest width;
        wherein the crossbar that has the smallest width is located closest to the end to couple to sense circuitry and the crossbar that has the largest width is located furthest away from the end to couple to sense circuitry; and
    sense circuitry connected to the first and second plurality of conductive drive lines; the sense circuitry configured to detect and process the change in capacitance at one or more touch-sensor nodes to determine the presence and location of a touch input.

2. The apparatus of claim 1, wherein the drive and sense electrodes comprise indium tin oxide.

3. The apparatus of claim 2, wherein each crossbar has at least one tip that is furthest from the spine; wherein a worst case charge transfer time from the tip to the end of the spine to couple to drive lines does not exceed a predetermined threshold.

4. The apparatus of claim 3, wherein the worst case charge transfer time to each tip is substantially equal.

5. The apparatus of claim 4, wherein the lengths of each crossbar for at least one spine are substantially the same.

6. The apparatus of claim 3, wherein the widths of two adjacent crossbars of at least one spine are substantially the same.

7. The apparatus of claim 1, wherein the drive and sense electrodes comprise transparent conductive polymers.

8. A touchscreen display comprising:
    a layer containing a plurality of substantially transparent longitudinal drive electrodes separated from each other by a gap;
    a layer containing a plurality of substantially transparent sense electrodes formed in the shape of spines running transverse to the drive electrodes; wherein each sense electrode spine comprises an end to couple to drive lines and a plurality of crossbars that generally run in the same direction as the drive electrodes;

a first plurality of conductive drive lines electrically connected to the plurality of drive electrodes;

a second plurality of conductive drive lines electrically connected to the plurality of sense electrodes;

a dielectric layer separating the layer of drive electrodes from the layer of sense electrodes; and an underlying display configured to produce an image;

wherein the plurality of sense electrodes comprises at least two sense electrode spines wherein a first sense electrode spine is connected to drive lines at a first end of the first sense electrode spine, and a second sense electrode spine is connected to drive lines at a second end of the second sense electrode spine;

wherein the first end and second end are on opposite sides; wherein the first sense electrode spine and the second sense electrode spine are adjacent to each other;

wherein the plurality of crossbars generally increase in width wherein the crossbar that has the smallest width is located closest to the end to couple to sense circuitry and the crossbar that has the largest width is located furthest away from the end to couple to sense circuitry;

wherein the crossbar of the first sense electrode spine that has the largest width runs adjacent to the crossbar of the second sense electrode spine that has the smallest width, and the crossbar of the first sense electrode spine that has the smallest width runs adjacent to the crossbar of the second sense electrode spine that has the largest width.

9. The touchscreen display of claim 8, wherein the drive and sense electrodes comprise indium tin oxide.

10. The touchscreen display of claim 9, wherein each crossbar has at least one tip that is furthest from the spine; wherein a worst case charge transfer time from the tip to the end of the spine to couple to drive lines does not exceed a predetermined threshold.

11. The touchscreen display of claim 10, wherein the worst case charge transfer time to each tip is substantially equal.

12. The touchscreen display of claim 11, wherein the lengths of each crossbar for at least one spine are substantially the same.

13. The touchscreen display of claim 10, wherein the widths of two adjacent crossbars of at least one spine are substantially the same.

14. The touchscreen display of claim 8, wherein the drive and sense electrodes comprise transparent conductive polymers.

15. A touchscreen display comprising:

a layer containing a plurality of substantially transparent longitudinal drive electrodes separated from each other by a gap;

a layer containing a plurality of substantially transparent sense electrodes formed in the shape of spines running transverse to the drive electrodes; wherein each sense electrode spine comprises an end to couple to drive lines and a plurality of crossbars that generally run in the same direction as the drive electrodes;

a first plurality of conductive drive lines electrically connected to the plurality of drive electrodes;

a second plurality of conductive drive lines electrically connected to the plurality of sense electrodes;

a dielectric layer separating the layer of drive electrodes from the layer of sense electrodes; and an underlying display configured to produce an image;

wherein the plurality of sense electrodes comprises at least two sense electrode spines wherein a first sense electrode spine is connected to drive lines at a first end of the first sense electrode spine, and a second sense electrode spine is connected to drive lines at a second end of the second sense electrode spine;

wherein the first sense electrode spine and the second sense electrode spine are adjacent to each other;

wherein the plurality of crossbars generally increase in width wherein the crossbar that has the smallest width is located closest to the end to couple to sense circuitry and the crossbar that has the largest width is located furthest away from the end to couple to sense circuitry;

wherein the crossbar of the first sense electrode spine that has the largest width runs adjacent to the crossbar of the second sense electrode spine that has the smallest width, and the crossbar of the first sense electrode spine that has the smallest width runs adjacent to the crossbar of the second sense electrode spine that has the largest width.

16. The touchscreen display of claim 15, wherein the drive and sense electrodes comprise indium tin oxide.

17. The touchscreen display of claim 16, wherein each crossbar has at least one tip that is furthest from the spine; wherein a worst case charge transfer time from the tip to the end of the spine to couple to drive lines does not exceed a predetermined threshold; wherein the worst case charge transfer time to each tip is substantially equal.

18. The touchscreen display of claim 17, wherein the lengths of each crossbar for at least one spine are substantially the same.

19. The touchscreen display of claim 17, wherein the widths of two adjacent crossbars of at least one spine are substantially the same.

20. The touchscreen display of claim 15, wherein the first end of the first sense electrode spine and the second end of the second sense electrode spine are on the same side.

* * * * *